United States Patent
Ito et al.

(10) Patent No.: US 10,014,136 B2
(45) Date of Patent: Jul. 3, 2018

(54) ILLUMINATION SWITCH

(71) Applicant: ALPS ELECTRIC CO., LTD., Tokyo (JP)

(72) Inventors: Toru Ito, Miyagi-ken (JP); Yoshiyuki Tagawa, Miyagi-ken (JP); Aya Aizawa, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/611,143

(22) Filed: Jun. 1, 2017

(65) Prior Publication Data
US 2017/0358408 A1   Dec. 14, 2017

(30) Foreign Application Priority Data
Jun. 13, 2016 (JP) .................. 2016-117238

(51) Int. Cl.
| H01H 21/02 | (2006.01) |
| B60T 7/08 | (2006.01) |
| F21V 8/00 | (2006.01) |
| G05G 1/04 | (2006.01) |
| H01H 21/22 | (2006.01) |

(52) U.S. Cl.
CPC ........... *H01H 21/025* (2013.01); *B60T 7/085* (2013.01); *G02B 6/002* (2013.01); *G02B 6/006* (2013.01); *G02B 6/0081* (2013.01); *G05G 1/04* (2013.01); *H01H 21/22* (2013.01); *H01H 2219/028* (2013.01); *H01H 2219/062* (2013.01); *H01H 2231/026* (2013.01)

(58) Field of Classification Search
CPC ...... H01H 21/625; H01H 21/22; G02B 6/002; G02B 6/006; G02B 6/0083; G05G 1/04
See application file for complete search history.

(56) References Cited

U.S. PATENT DOCUMENTS

| 5,063,479 A | 11/1991 | Satoh | |
| 2006/0209518 A1* | 9/2006 | Nishimoto | H01H 19/025 361/760 |
| 2009/0000929 A1 | 1/2009 | Nishiyama et al. | |
| 2010/0270137 A1* | 10/2010 | Mae | H01H 25/041 200/313 |
| 2013/0229783 A1* | 9/2013 | Fendeleur | B60K 37/06 362/23.04 |
| 2016/0181028 A1* | 6/2016 | Ebrom | H01H 19/025 362/23.04 |
| 2017/0162346 A1* | 6/2017 | Ebrom | H01H 19/025 |

FOREIGN PATENT DOCUMENTS

| JP | H07-1708 Y2 | 1/1995 |
| JP | 2009-9790 A | 1/2009 |

* cited by examiner

*Primary Examiner* — Ali Alavi
(74) *Attorney, Agent, or Firm* — Brinks Gilson & Lione

(57) ABSTRACT

A light guide body rotates integrally with an operation knob, has an incident surface that is a concavely curved surface recessed to a side opposite to a light source side, and rotates about a rotation shaft located so as to intersect the incident surface of the light guide body. The incident surface of the light guide body is a concavely curved surface recessed toward the side opposite to the light source (toward a Z1 direction) on a cross-section taken along an X-Z plane.

20 Claims, 10 Drawing Sheets

ILLUMINATION SWITCH

CLAIM OF PRIORITY

This application claims benefit of priority to Japanese Patent Application No. 2016-117238 filed on Jun. 13, 2016, which is hereby incorporated by reference in its entirety.

BACKGROUND

1. Field of the Disclosure

The present disclosure relates to an illumination switch having a function to illuminate an illumination surface such as an operation surface of an operation knob by light from a light source.

2. Description of the Related Art

Japanese Examined Utility Model Registration Application Publication No. 7-1708 discloses an illumination switch provided with an illumination portion 24a in an upper surface of an operation portion that is operated with a finger or the like to be rotated. Light from a light source that is provided below the operation portion is guided through a light guide body to the illumination portion 24a.

A configuration is disclosed in which the operation portion 31 is provided with a light guide path in which a hole 23b bored so as to penetrate in the up-down direction, and a light emission portion is disposed between projections of the operation portion 31. According to the configuration, even when an illumination area is not directly above the light source, it is possible to illuminate the illumination portion of the operation portion by using the light guide member.

In addition, Japanese Unexamined Patent Application Publication No. 2009-9790 discloses an illumination switch that includes: an operation knob having an operation surface; a first light guide member 20 that guides light emitted from a light source provided to the operation knob, to the operation surface; and a second light guide member 30 that makes the light emitted from the light source, into parallel light. In the illumination switch, parallel light R1 emitted from the second light guide member 30 is refracted from an incident surface 21 of the first light guide member 20. Light R3 after the refraction propagates through the interior of the second light guide member 30 and is reflected by a reflection surface 23 provided at a bottom portion of the second light guide member 30. Light R4 after the reflection propagates through the interior of the first light guide member 20 in a second direction D2 and reaches a light emission surface 22. In the illumination switch, the light emitted from the light source is reflected by the reflection surface 23 and then emitted, so that it is possible to direct sufficient light also to a peripheral portion of the light emission surface 22, and it is possible to prevent brightness unevenness of the light emission surface 22.

However, in the existing illumination switch described above, when the operation knob having the illumination surface rotates relative to the light source by an operation with a finger or the like, brightness (illumination) unevenness occurs in the illumination surface due to a change in the path through which the light from the light source is guided to the illumination surface.

SUMMARY

An illumination switch includes: a light source; an operation knob having an illumination surface including a translucent portion in at least a portion thereof; a light guide body that rotates integrally with the operation knob and emits light entering through an incident surface from the light source, through a light emission surface located at the illumination surface side; and a switch body that detects rotation of the operation knob, wherein a cross-section of the incident surface of the light guide body is a concavely curved surface that is recessed toward a side opposite to the light source, and the light guide body rotates about a rotation shaft that is located so as to intersect the incident surface or is located at the light source side with respect to the incident surface.

With this configuration, because of the configuration in which the light guide body rotates integrally with the operation knob, the incident surface of the light guide body is formed as a concavely curved surface recessed at the side opposite to the light source, and the light guide body rotates about the rotation shaft located so as to intersect the incident surface or is located at the light source side with respect to the incident surface, even when the operation knob rotates, it is possible to efficiently cause the light from the light source to enter the light guide body, and it is possible to efficiently guide the light entering the light guide body, to the illumination surface of the operation knob to enhance the brightness of the illumination surface.

Even when the operation knob rotates, the positional relationship between the light guide body and the operation knob does not change, so that the brightness (illuminance) unevenness does not change.

DESCRIPTION OF THE EXEMPLARY EMBODIMENTS

Figure 1:
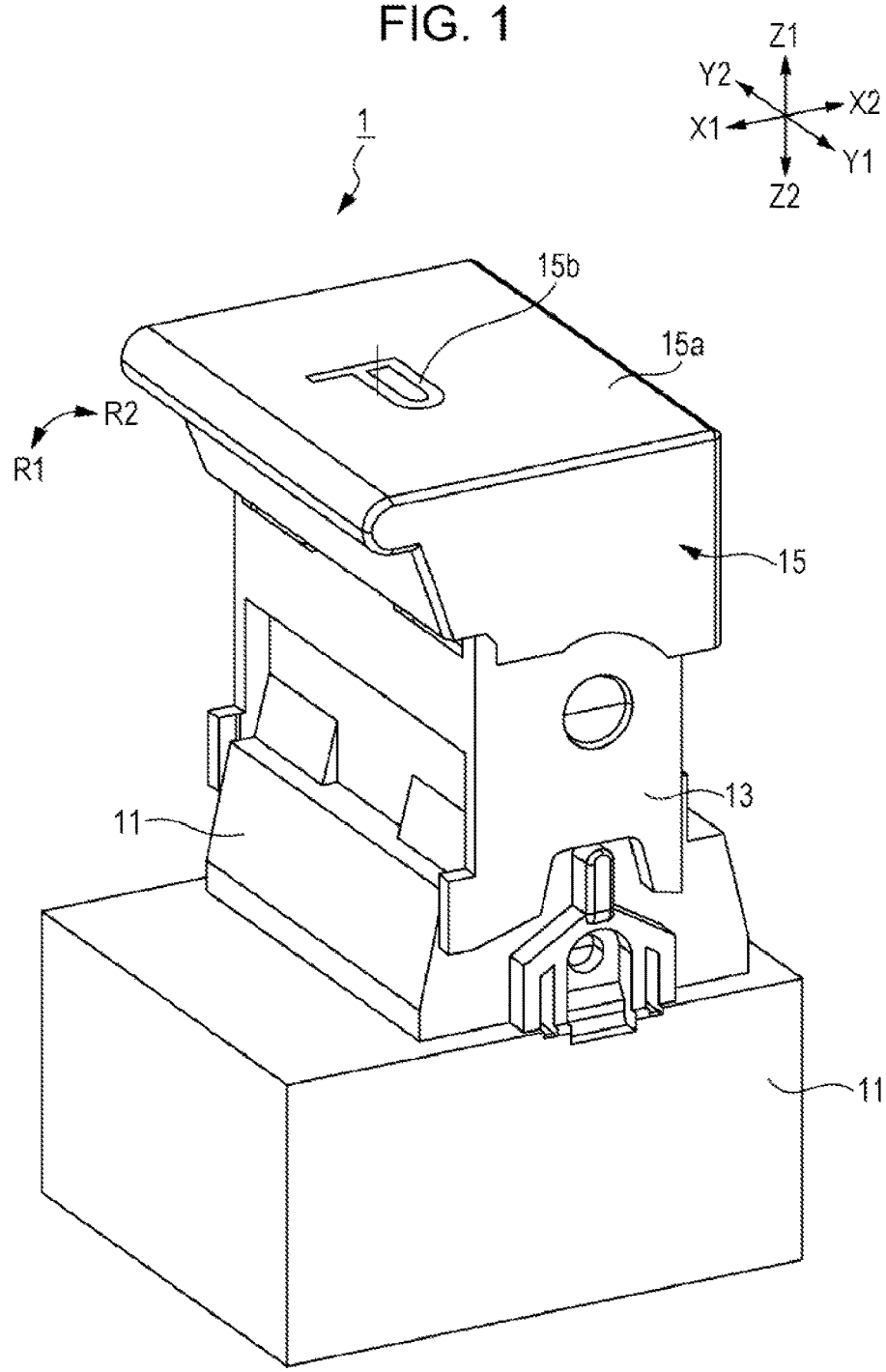
FIG. 1 is an external perspective view of an illumination switch according to an embodiment of the present invention.
Figure 2:
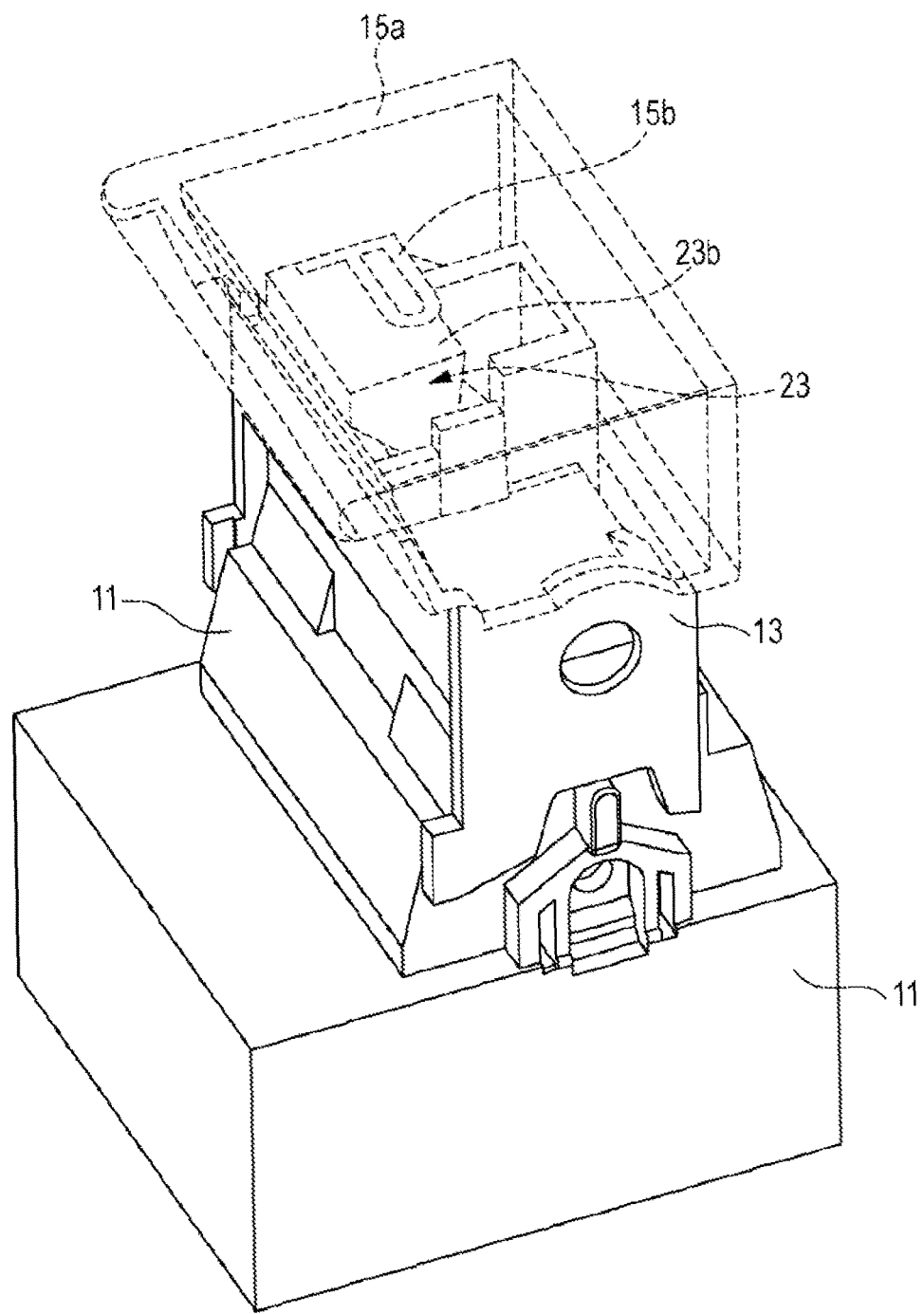
FIG. 2 is a diagram for illustrating the positional relationship between an illumination surface of the illumination switch shown in FIG. 1 and a light emission surface of a light guide body.
Figure 3:
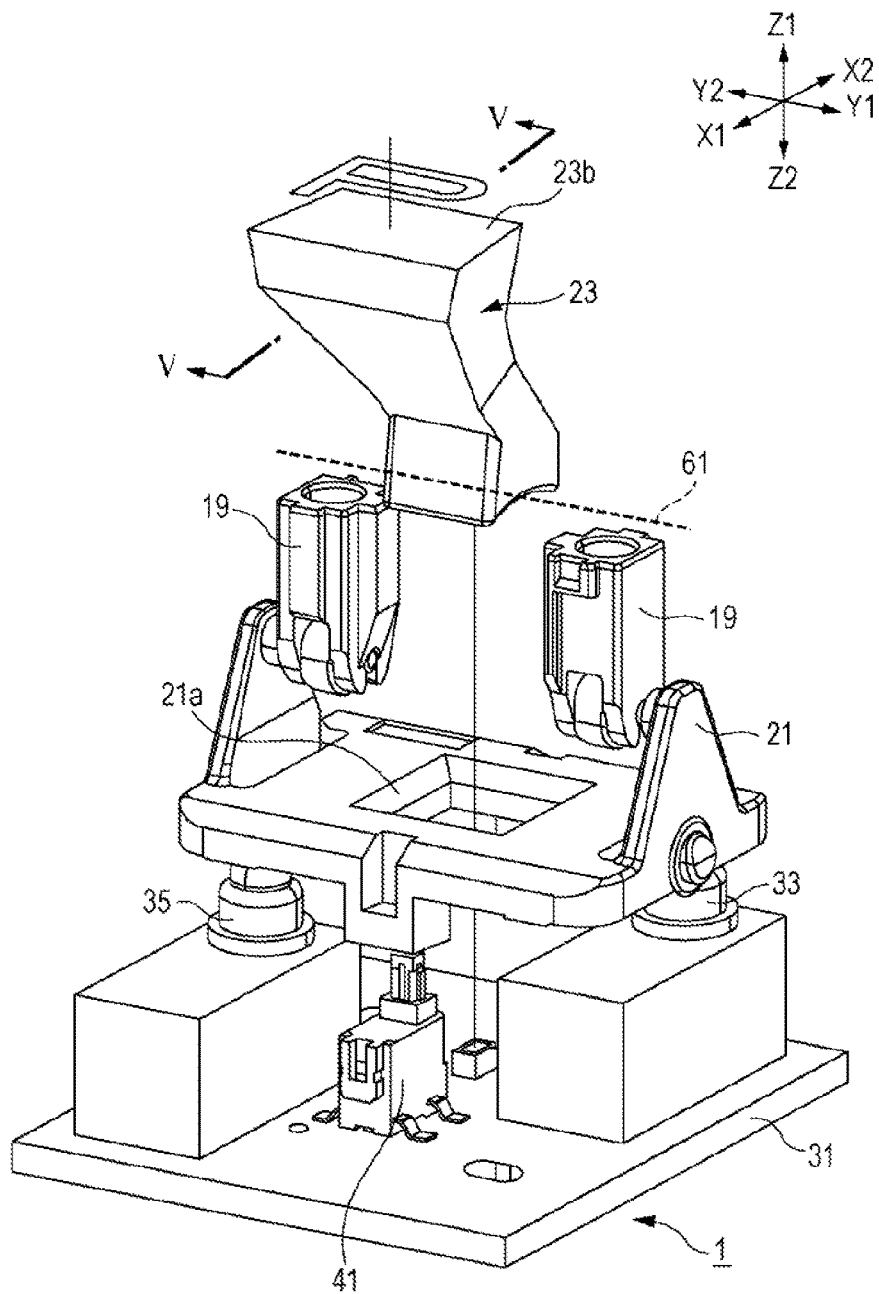
FIG. 3 is an external perspective view in which a case, a knob support portion, and an operation knob are removed from the illumination switch shown in FIG. 1.
Figure 4:
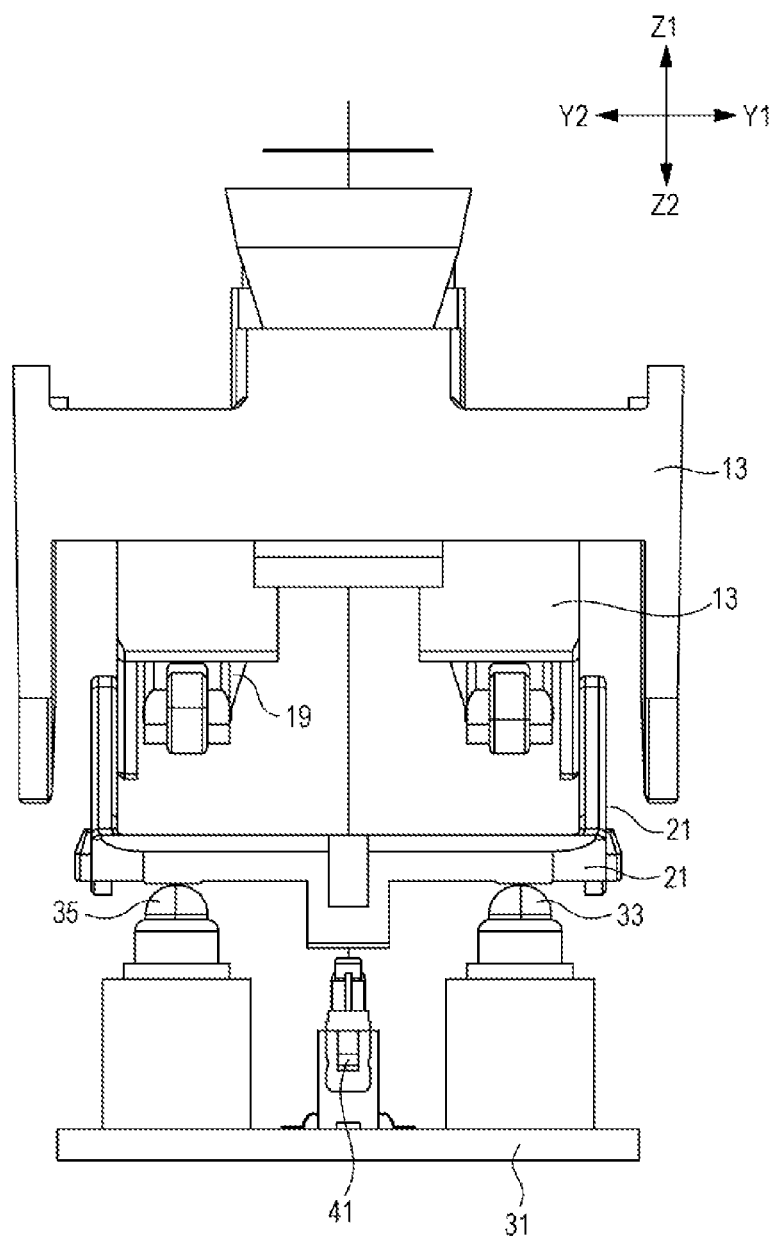
FIG. 4 is a view as seen from the direction from X1 to X2 in a state where the case and the operation knob shown in FIG. 1 are removed.

FIG. 1 is an external perspective view of an illumination switch according to an embodiment of the present invention, FIG. 2 is a diagram for illustrating the positional relationship between an illumination surface of the illumination switch 1 shown in FIG. 1 and a light emission surface 23b of a light guide body 23, FIG. 3 is an external perspective view in which a case 11, a knob support portion 13, and an operation knob 15 are removed from the illumination switch 1 shown in FIG. 1, and FIG. 4 is a view as seen from the direction from X1 to X2 in a state where the case 11 and the operation knob 15 shown in FIG. 1 are removed.

The illumination switch 1 is, for example, a switch for an electric parking brake (EPB). The operation knob 15 rotates in an R1 or R2 direction shown in FIG. 1 by an operation with a finger or the like. In a non-operated state, the operation knob 15 takes an attitude in which an illumination surface 15a is orthogonal to a Y1-Y2 direction as shown in FIG. 1. Meanwhile, when the operation knob 15 is rotationally operated in the R1 direction with a finger or the like, the illumination surface 15a is tilted at a predetermined angle (other than 90°) relative to the Y1-Y2 direction which is a light emission direction from a light source 41.

In the illumination switch 1, for uniformly illuminating the illumination surface 15a without influence of rotation of the operation knob 15 and without illumination unevenness, an incident surface 23a and a reflection surface 23c of the light guide body 23 which is integrated with the operation knob 15 have concavely curved surface shapes, and a rotation shaft 61 is provided so as to intersect the incident surface 23a of the light guide body 23.

As shown in FIG. 1, for example, the illumination switch 1 is rotatably mounted on the case 11 such that the knob support portion 13 and the operation knob 15 are integrated with each other.

The operation knob 15 has, at the upper side thereof, the illumination surface 15a that is illuminated by light from the light source 41. A translucent portion 15b having a pattern of a display character (e.g., "P") is formed in the illumination surface 15a. In the operation knob 15, the translucent portion 15b part is translucent, and the part other than the translucent portion 15b is formed of a light shielding member.

As shown in FIG. 3, as seen from the front direction (the direction from X1 toward X2), two holders 19 are fixed at line-symmetrical positions on the knob support portion 13 which holds the operation knob 15.

In addition, a cam 21 and the light guide body 23 are fixed to the knob support portion 13.

That is, in response to rotation of the operation knob 15, the knob support portion 13, the holders 19, the cam 21 and the light guide body 23 integrally rotate about the rotation shaft 61.

As shown in FIG. 3, the rotation shaft 61 intersects the incident surface 23a of the light guide body 23.

As shown in FIGS. 3 and 4, a substrate 31 is provided within the case 11, and two switches 33 and 35 are fixed on the substrate 31.

In the illumination switch 1, when an operator pulls the operation knob 15 in the X1 direction with a finger or the like, the operation knob 15 rotates about the rotation shaft 61 in the R1 direction.

At this time, the knob support portion 13, the holders 19, the cam 21, and the light guide body 23 rotate in the R1 direction integrally with the operation knob 15. Accordingly, the switch 35 is pressed down by the cam 21. Then, the operation knob 15 is maintained in an attitude with a predetermined angle in the R1 direction.

Meanwhile, in the illumination switch 1, when the operator presses the operation knob 15 in the X2 direction (or presses the operation knob 15 in the R1 direction) with a finger or the like, the operation knob 15 rotates about the rotation shaft 61 in the R2 direction. At this time, the knob support portion 13, the holders 19, the cam 21, and the light guide body 23 rotate in the R2 direction integrally with the operation knob 15. Accordingly, the switch 33 is pressed down by the cam 21.

Each of the switches 33 and 35 outputs (performs electric conversion to) an electric signal corresponding to a pressing force.

In addition, the light source 41 is provided between the switch 33 and the switch 35 on the substrate 31. The light source 41 emits light toward the incident surface 23a of the light guide body 23 with the direction from Z2 to Z1 as a light emission direction. The light source 41 is, for example, a LED light source.

As shown in FIG. 3, the cam 21 has an opening 21a that allows the light from the light source 41 to pass therethrough.

Figure 5:
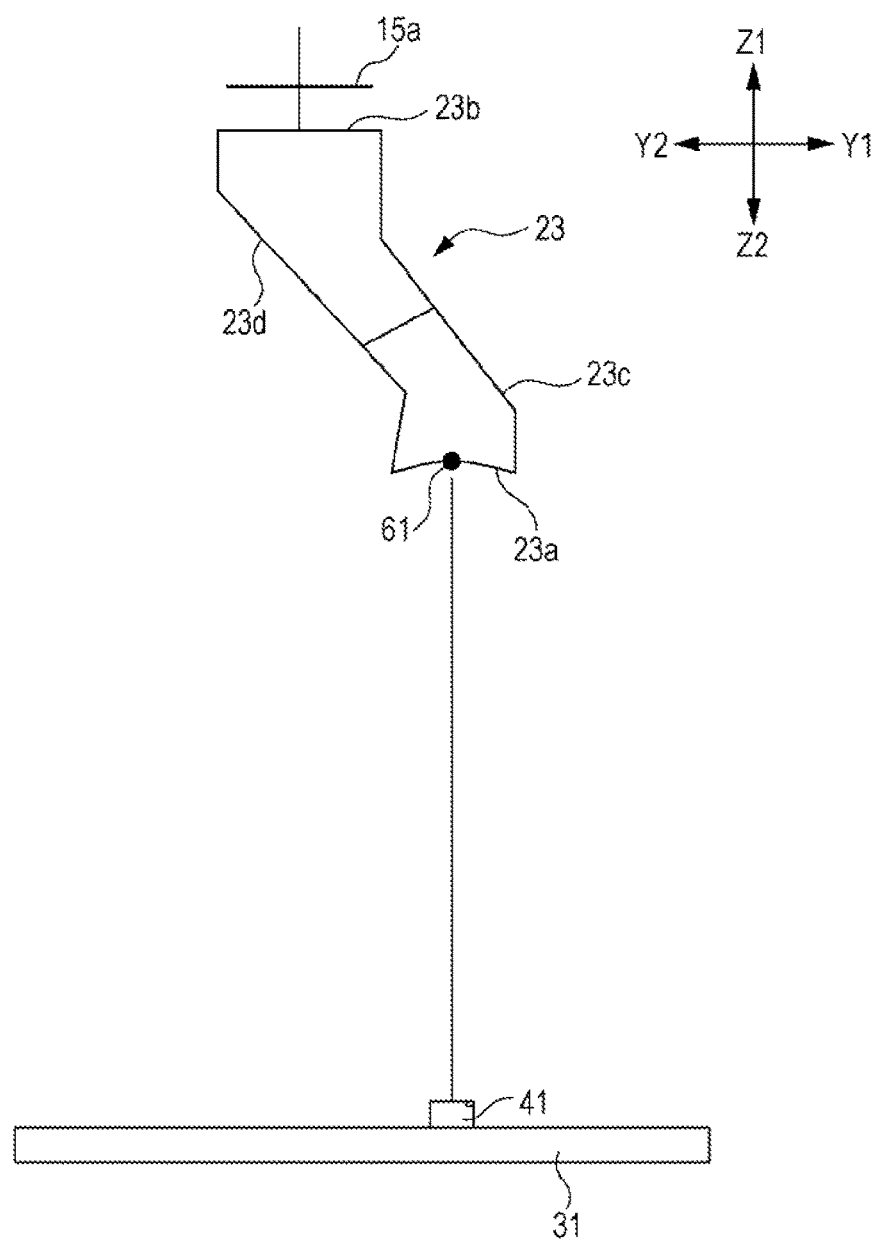
FIG. 5 is a diagram for illustrating the positional relationship between the light guide body and a light source in the cross-sectional direction of a cross-directional line A-A shown in FIG. 3.

FIG. 5 is a diagram for illustrating the positional relationship between the light guide body 23 and the light source 41 in the cross-sectional direction of a cross-directional line A-A shown in FIG. 3. In FIG. 5, only the light guide body 23, the substrate 31, and the light source 41 are shown.

Figure 6:
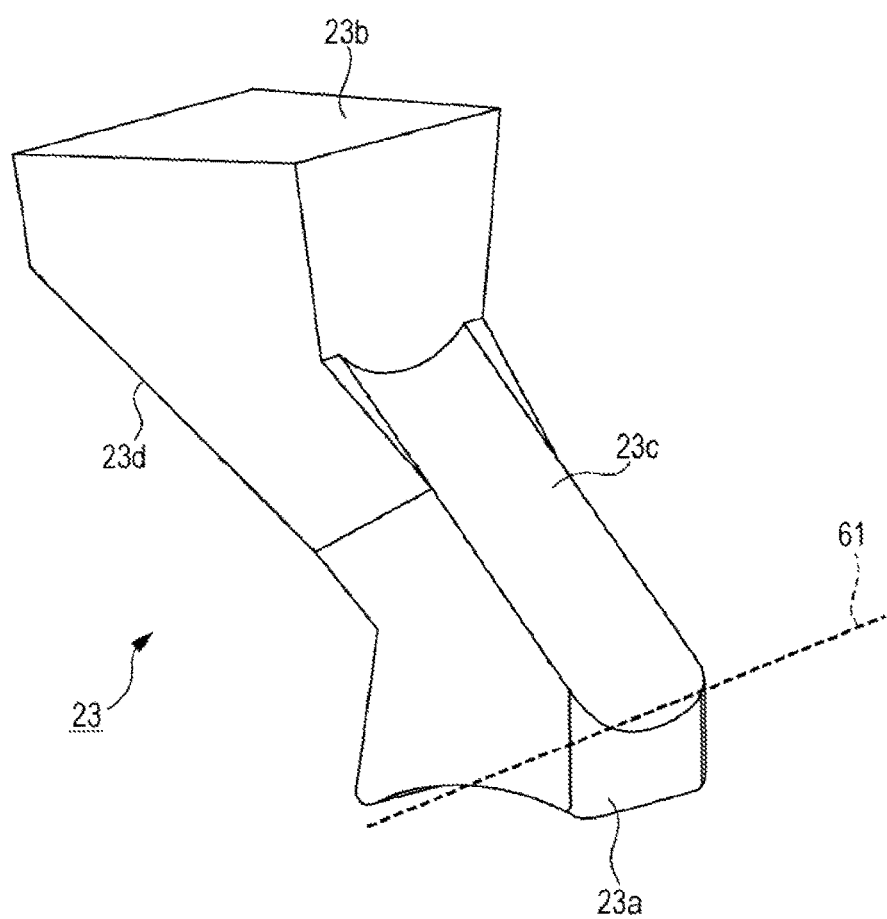
FIG. 6 is a perspective view for illustrating a Z1 side shape of the light guide body.
Figure 7:
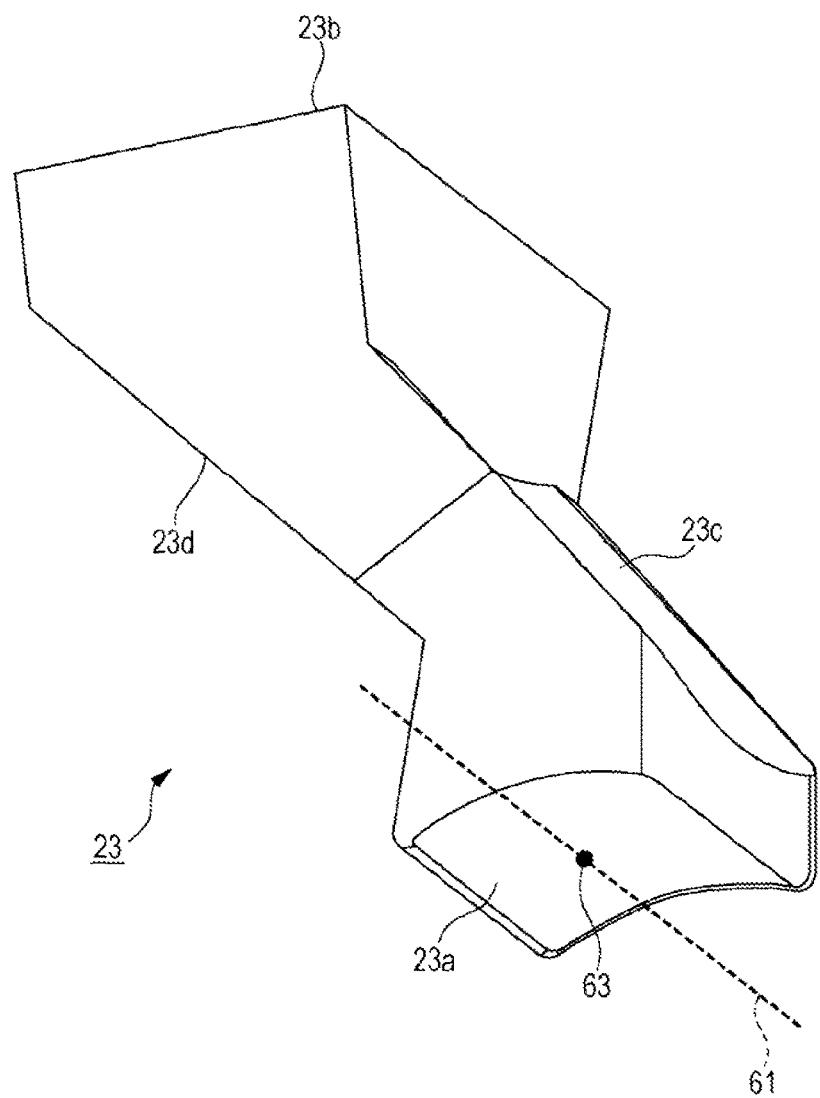
FIG. 7 is a perspective view for illustrating a Z2 side shape of the light guide body.
Figure 8:
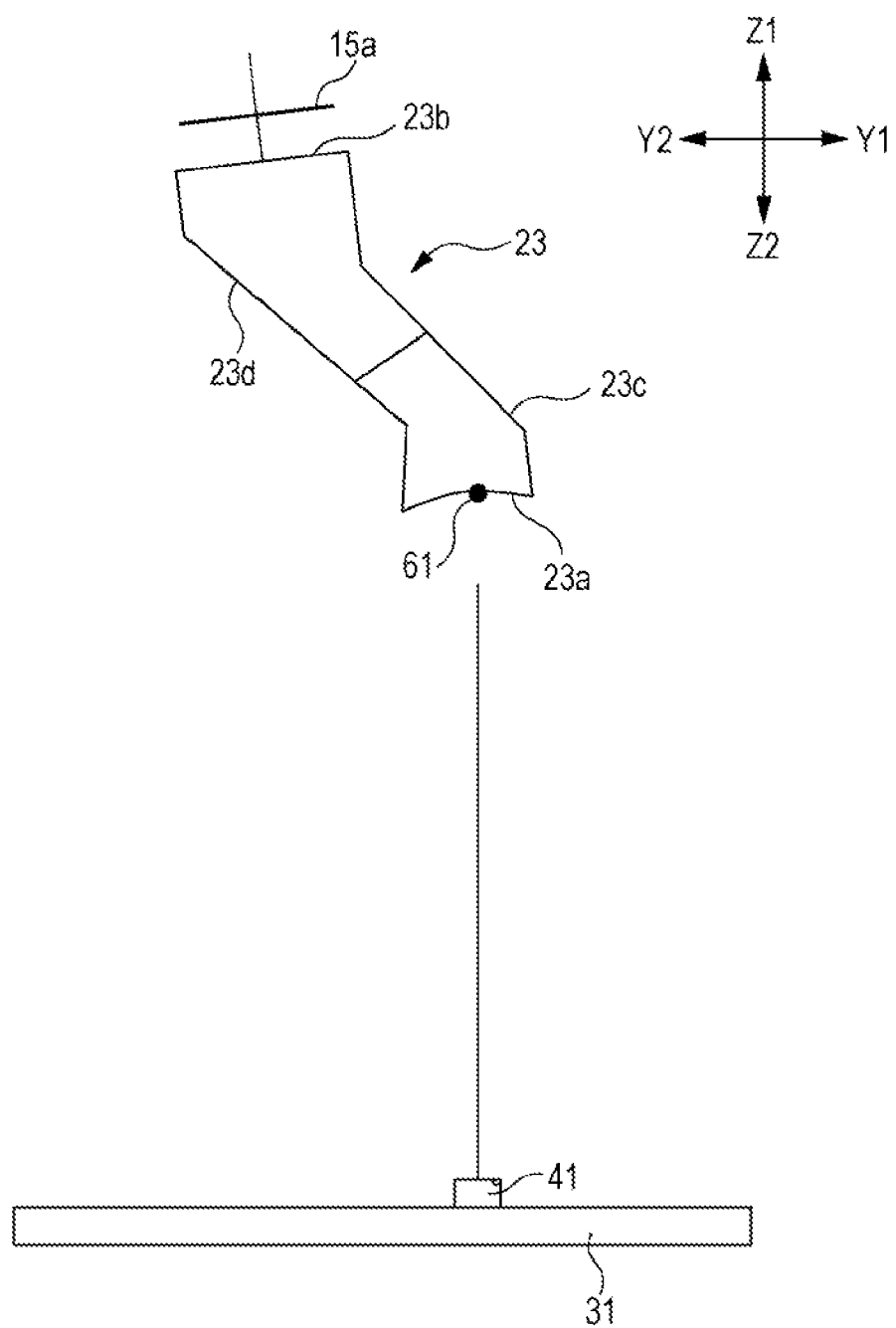
FIG. 8 is a diagram for illustrating the positional relationship between the light emission surface and the light source after the operation knob in FIG. 5 is operated.

FIG. 6 is a perspective view for illustrating a Z1 side shape of the light guide body 23, FIG. 7 is a perspective view for illustrating a Z2 side shape of the light guide body 23, and FIG. 8 is a diagram for illustrating the positional relationship between the light emission surface 23b and the light source 41 after the operation knob 15 in FIG. 5 is operated.

The light guide body 23 is formed of, for example, a single member integrally with the operation knob 15, and rotates about the rotation shaft 61 integrally with the operation knob 15.

With this configuration, it is possible to integrally mold the operation knob 15 and the light guide body 23, so that it is possible to facilitate the production process. In addition, positional displacement does not occur between the operation knob 15 and the light guide body 23, so that it is possible to enhance the brightness of the illumination surface 15a.

The light guide body 23 receives the light from the light source 41 through the incident surface 23a, guides the light to the light emission surface 23b, and emits the light through the light emission surface 23b toward the illumination surface 15a of the operation knob 15. The light emission surface 23b is parallel to the illumination surface 15a.

The incident surface 23a is a concavely curved surface that is recessed toward the side opposite to the light source 41 (toward the Z1 direction) in a cross-section taken along an X-Z plane.

Since the incident surface 23a is a concavely curved surface as described above, it is possible to uniformly diffuse light in the Y1-Y2 direction of the light emission surface 23b.

The concavely curved surface that is the incident surface 23a has an arc cross-section along the cross-sectional line A-A which passes through the center of the incident surface 23a and is orthogonal to the Y1-Y2 direction.

As shown in FIG. 7, the light guide body 23 rotates about the rotation shaft 61 (rotary shaft) which passes through the center 63 of the arc-shaped concavely curved surface that is the incident surface 23a and which is orthogonal to the above cross-section.

With this configuration, even when the operation knob 15 rotates, the strongest light from the light source 41 is always incident at the center of the incident surface 23a of the light guide body 23, so that it is possible to inhibit brightness unevenness from occurring due to the rotation, and make the brightness of the illumination surface 15a even.

The light guide body 23 has the reflection surfaces 23c and 23d which are inner surfaces which reflect the light entering through the incident surface 23a. In the present embodiment, only the reflection surface 23c is a concavely curved surface that is recessed toward the inner side of the light guide body 23.

The diameter of the concavely curved surface that is the light emission surface 23b is determined such that reflection unevenness does not occur.

The reflection surfaces 23c and 23d are located such that only the light reflected by these reflection surfaces, of the light entering through the incident surface 23a, is incident on the light emission surface 23b.

With this configuration, the light entering through the incident surface 23a is reflected by the reflection surfaces 23c and 23d and guided to the light emission surface 23b, so that it is possible to widen and guide the light to the light emission surface 23b to enhance the uniformity of the light. Thus, it is possible to inhibit brightness (illumination) unevenness from occurring in an illumination area of the illumination surface 15a.

In addition, in the illumination switch 1, the illumination surface 15a and the incident surface 23a are disposed so as to be displaced from each other in an X-Y plane direction orthogonal to the direction (Z1-Z2 direction) in which the light is emitted from the light source 41.

With this configuration, it is possible to make the brightness of the illumination surface 15a even without directly emitting, from the light emission surface 23b, the light entering through the incident surface 23a from the light source 41.

The rotation shaft 61 is provided in the operation knob 15. The rotation shaft 61 may be provided in the light guide body 23.

Hereinafter, operation of the illumination switch 1 will be described.

In a state where the operation knob 15 is not operated, in an attitude in which the illumination surface 15a of the operation knob 15 and the light emission surface 23b of the light guide body 23 are orthogonal to the Z1-Z2 direction, the light from the light source 41 is applied to the incident surface 23a of the light guide body 23 as shown in FIG. 5. At this time, the light intensity at the center 63 of the incident surface 23a is the highest.

The light applied to the incident surface 23a is diffused in the X1-X2 direction by the concavely curved surface that is the incident surface 23a.

The light entering through the incident surface 23a is reflected by the reflection surface 23c toward the reflection surface 23d. At this time, the light is diffused at the reflection surface 23c such that when the light reaches the light emission surface 23b, the brightness becomes even in the Y1-Y2 direction.

The light reflected by the reflection surface 23d from the reflection surface 23c toward the light emission surface 23b passes through the light emission surface 23b and is applied to the illumination surface 15a.

As described above, the light from the light source 41 is applied such that the light intensity at the center 63 of the light emission surface 23b is the highest, and the light is diffused by the incident surface 23a and the reflection surface 23c, whereby it is possible to make the brightness of the illumination surface 15a even.

Next, in the illumination switch 1, when the operator rotates the operation knob 15 with a finger or the like in the R1 direction shown in FIG. 1, the knob support portion 13, the holders 19, the cam 21, and the light guide body 23 rotate in the R1 direction integrally with the operation knob 15. Accordingly, the switch 35 is pressed down by the cam 21.

Thus, the positional relationship between the illumination surface 15a, the light guide body 23, and the light source 41 is as shown in FIG. 8.

That is, the illumination surface 15a is tilted from the Z1-Z2 direction.

In the illumination switch 1, the light guide body 23 rotates integrally with the operation knob 15 about the rotation shaft 61 which passes through the center 63 of the arc concavely curved surface that is the incident surface 23a and which extends in the direction orthogonal to the above cross-section, and thus, even in an attitude in FIG. 8, the light from the light source 41 is applied such that the light intensity at the center 63 of the light emission surface 23b is the highest.

Therefore, even in the attitude in FIG. 8, it is possible to illuminate the illumination surface 15a of the operation knob 15 by uniform light, similarly to the attitude in FIG. 5.

As described above, in the illumination switch 1, because of the configuration in which the light guide body 23 rotates integrally with the operation knob 15, the incident surface 23a of the light guide body 23 is formed as a concavely curved surface recessed at the side opposite to the light source 41, and the light guide body 23 rotates about the rotation shaft 61 located so as to intersect the incident surface 23a, even when the operation knob 15 rotates, it is possible to efficiently cause the light from the light source 41 to enter the light guide body 23, and it is possible to efficiently guide the light entering the light guide body 23, to the illumination surface 15a of the operation knob 15 to enhance the brightness of the illumination surface 15a.

Even when the operation knob 15 rotates, the positional relationship between the light guide body 23 and the operation knob 15 does not change, so that the brightness (illuminance) unevenness does not change.

In addition, in the illumination switch 1, the light guide body 23 is formed of a single member integrally with the operation knob 15, and rotates about the rotation shaft 61 integrally with the operation knob 15. Thus, it is possible to integrally mold the operation knob 15 and the light guide body 23, so that it is possible to facilitate the production process. Moreover, positional displacement does not occur between the operation knob 15 and the light guide body 23, so that it is possible to enhance the brightness of the illumination surface 15a.

In the illumination switch 1, the incident surface 23a of the light guide body 23 is a concavely curved surface that is recessed toward the side opposite to the light source (toward the Z1 direction) in a cross-section taken along the X-Z plane. Since the incident surface 23a is a concavely curved surface as described above, it is possible to uniformly diffuse light in the Y1-Y2 direction of the light emission surface 23b.

In the illumination switch 1, the light guide body 23 rotates about the rotation shaft 61 (rotary shaft) which passes through the center 63 of the arc-shaped concavely curved surface that is the incident surface 23a and is orthogonal to the above cross-section. Thus, even when the operation knob 15 the rotates, the strongest light from the light source 41 is always incident at the center of the incident surface 23a of the light guide body 23, so that it is possible to inhibit brightness unevenness from occurring due to rotation, and make the brightness of the illumination surface 15a even.

That is, the optical axis center of the light from the light source 41 is not displaced, so that it is possible to make the brightness even.

In the illumination switch 1, the reflection surfaces 23c and 23d are located such that only the light reflected by these reflection surfaces, of the light entering through the incident surface 23a, is incident on the light emission surface 23b. Thus, the light entering through the incident surface 23a is reflected by the reflection surfaces 23c and 23d and guided to the light emission surface 23b, so that it is possible to widen and guide the light to the light emission surface 23b to enhance the uniformity of the light. Thus, it is possible to inhibit brightness (illumination) unevenness from occurring in an illumination area of the illumination surface 15a.

In the illumination switch 1, the light emission surface 23b of the light guide body 23 is always kept parallel to the illumination surface 15a. Thus, the light emitted from the light emission surface 23b is able to be incident on the illumination surface 15a without being reflected, so that it is possible to enhance the brightness of the illumination surface 15a.

The present invention is not limited to the above-described embodiment.

That is, a person skilled in the art may make various changes, combinations, sub-combinations, and alternations regarding the components of the above-described embodiment within the technical scope or the scope of the equivalents of the present invention.

Figure 9:
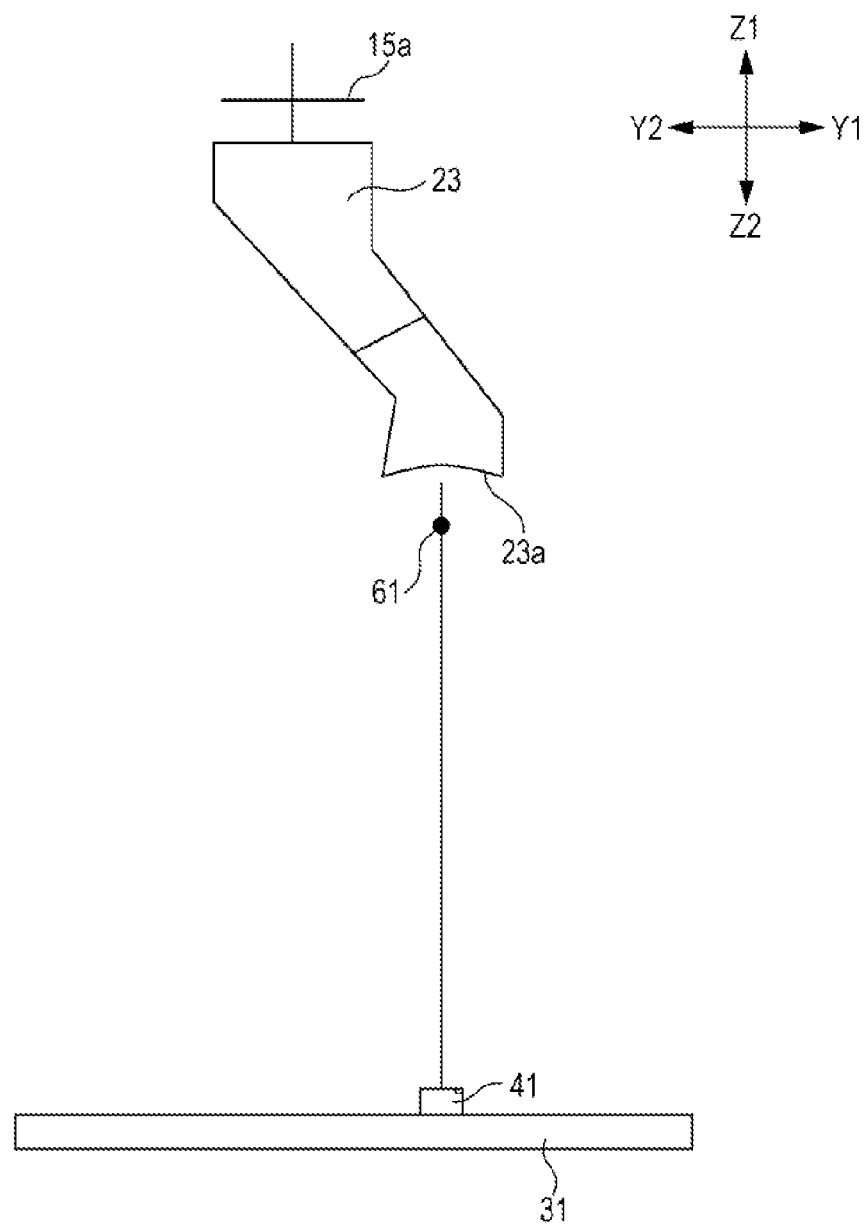
FIG. 9 is a diagram for illustrating a first modification of the illumination switch according to the embodiment of the present invention.

FIG. 9 is a diagram for illustrating a first modification of the illumination switch according to the embodiment of the present invention.

In the above-described embodiment, the case has been described in which the rotation shaft 61 is provided so as to pass through the incident surface 23a of the light guide body 23 as shown in FIGS. 5 and 8. However, the rotation shaft 61 may be provided at the light source 41 side with respect to the incident surface 23a as shown in FIG. 9.

Figure 10:
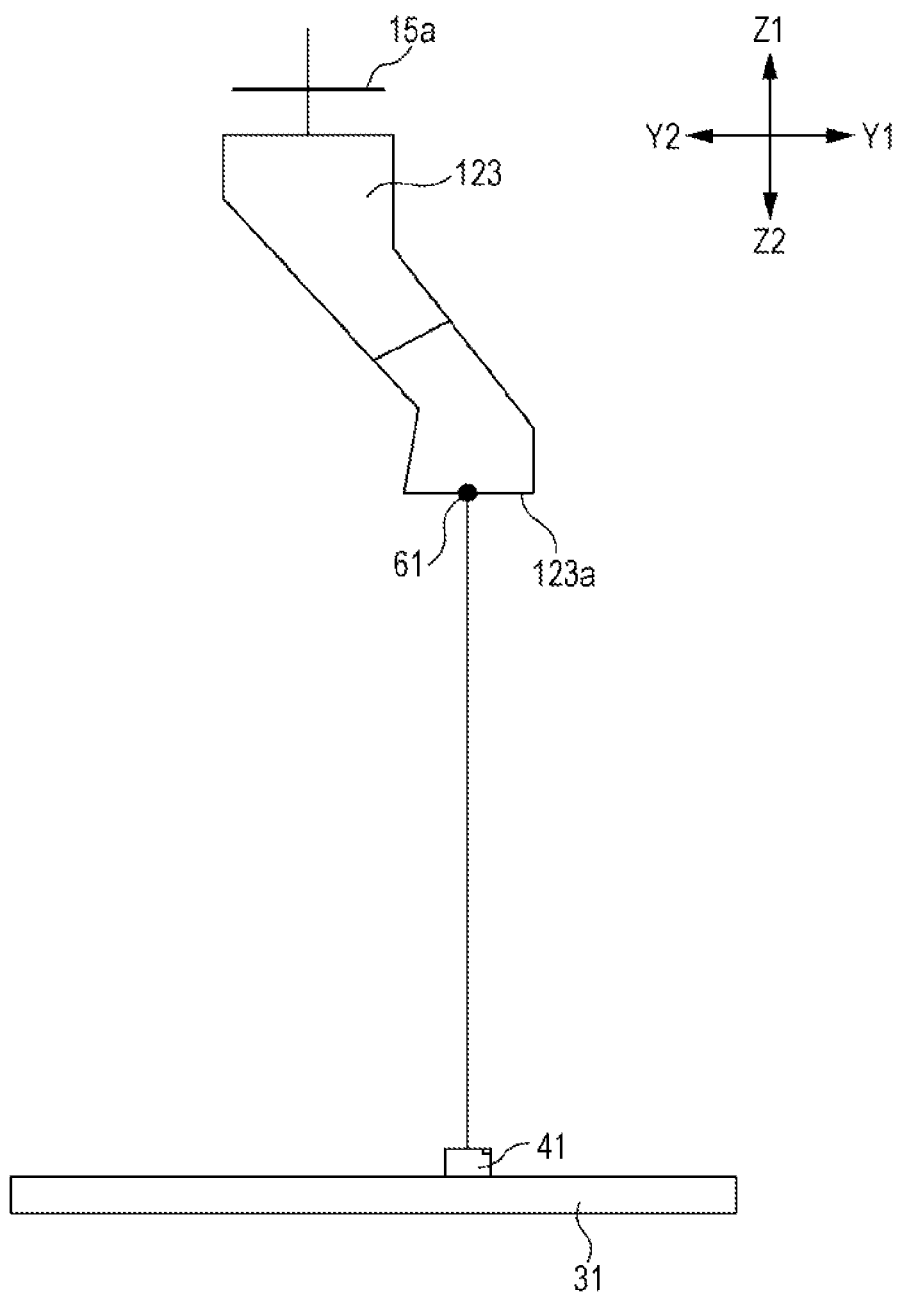
FIG. 10 is a diagram for illustrating a second modification of the illumination switch according to the embodiment of the present invention.

FIG. 10 is a diagram for illustrating a second modification of the illumination switch according to the embodiment of the present invention.

In the above-described embodiment, the case has been described in which the incident surface 23a is a concavely curved surface. However, a light guide body 123 having an incident surface 123a that is a flat surface as shown in FIG. 10 may be used. The rotation shaft 61 is defined so as to pass through the center 161 of the incident surface 123a.

Even with this configuration, even when the operation knob 15 rotates, the strongest light from the light source 41 is always incident at the center of the incident surface 123a of the light guide body 123, so that it is possible to inhibit brightness unevenness from occurring due to rotation, and make the brightness of the illumination surface 15a even.

In addition, the incident surface 23a may be another curved surface such as a spherical surface.

The present invention is applicable to, for example, an illumination switch of an operation lever of a vehicle or the like.

What is claimed is:

1. An illumination switch comprising:
   a light source;
   an operation knob having an illumination surface including a translucent portion in at least a portion thereof;
   a light guide body that rotates integrally with the operation knob and emits light entering through an incident surface from the light source, through a light emission surface located at the illumination surface side; and
   a switch body that detects rotation of the operation knob, wherein:
   a cross-section of the incident surface of the light guide body is a concavely curved surface that is recessed toward a side opposite to the light source, and
   the light guide body rotates about a rotation shaft that is located so as to intersect the incident surface.

2. The illumination switch according to claim 1, wherein the concavely curved surface has a substantially arc cross-section, and
   the rotation shaft passes through a center of the concavely curved surface and extends in a direction orthogonal to the cross-section.

3. The illumination switch according to claim 2, wherein the light guide body has a reflection surface that reflects the light entering through the incident surface and guides the light to the light emission surface.

4. The illumination switch according to claim 3, wherein the illumination surface and the incident surface are located so as to be displaced from each other in a direction orthogonal to a direction in which the light is emitted from the light source, and
   the light emission surface of the light guide body faces the illumination surface.

5. The illumination switch according to claim 4, wherein the light emission surface of the light guide body is parallel to the illumination surface.

6. The illumination switch according to claim 5, wherein the rotation shaft is provided to the operation knob or the light guide body.

7. The illumination switch according to claim 6, wherein the operation knob and the light guide body are integrally formed of a single member.

8. The illumination switch according to claim 3, wherein the light guide body has a plurality of the reflection surfaces that are tilted relative to the light emission direction and reflect the light from the light source.

9. The illumination switch according to claim 8, wherein at least one of the reflection surfaces is a concavely curved surface that is recessed toward an inner side of the light guide body.

10. The illumination switch according to claim 9, wherein the reflection surface is located such that only light reflected by the reflection surface, of the light entering through the incident surface, is incident on the light emission surface.

11. The illumination switch according to claim 10, wherein the light emission surface of the light guide body is parallel to the illumination surface.

12. The illumination switch according to claim 11, wherein the rotation shaft is provided to the operation knob or the light guide body.

13. The illumination switch according to claim 12, wherein the operation knob and the light guide body are integrally formed of a single member.

14. An illumination switch comprising:
   a light source;
   an operation knob having an illumination surface including a translucent region in at least a portion thereof;
   a light guide body that rotate integrally with the operation knob and emits light entering through an incident surface from the light source, through a light emission surface located at the illumination surface side; and
   a switch body that detects rotation of the operation knob, wherein
   the light guide body rotates about a rotation shaft that intersects the incident surface and that is orthogonal to a light emission direction from the light source.

15. An illumination switch comprising:
a light source;
an operation knob having an illumination surface including a translucent portion in at least a portion thereof;
a light guide body that rotates integrally with the operation knob and emits light entering through an incident surface from the light source, through a light emission surface located at the illumination surface side; and
a switch body that detects rotation of the operation knob, wherein:
a cross-section of the incident surface of the light guide body is a concavely curved surface that is recessed toward a side opposite to the light source, and
the light guide body rotates about a rotation shaft that is located at the light source side with respect to the incident surface.

16. The illumination switch according to claim 15, wherein
the concavely curved surface has a substantially arc cross-section, and
the rotation shaft passes through a center of the concavely curved surface and extends in a direction orthogonal to the cross-section.

17. The illumination switch according to claim 16, wherein the light guide body has a reflection surface that reflects the light entering through the incident surface and guides the light to the light emission surface.

18. The illumination switch according to claim 17, wherein
the illumination surface and the incident surface are located so as to be displaced from each other in a direction orthogonal to a direction in which the light is emitted from the light source, and
the light emission surface of the light guide body faces the illumination surface.

19. The illumination switch according to claim 18, wherein the light emission surface of the light guide body is parallel to the illumination surface.

20. The illumination switch according to claim 19, wherein the rotation shaft is provided to the operation knob or the light guide body.

* * * * *